US005723828A

United States Patent [19]
Nakagawa

[11] Patent Number: 5,723,828
[45] Date of Patent: Mar. 3, 1998

[54] HOLLOW PLASTIC PRODUCT HAVING A SOUND ATTENUATOR

[75] Inventor: Tatsuya Nakagawa, Matsudo, Japan

[73] Assignee: Excell Corporation, Chiba-ken, Japan

[21] Appl. No.: 518,376

[22] Filed: Aug. 23, 1995

[30] Foreign Application Priority Data

Aug. 26, 1994 [JP] Japan .................. 6-202492

[51] Int. Cl.$^6$ ...................................... F01N 1/02
[52] U.S. Cl. .................. 181/250; 181/246; 181/224; 181/229
[58] Field of Search .................... 181/227, 228, 181/229, 246, 250, 255, 273, 276, 282, 224

[56] References Cited

U.S. PATENT DOCUMENTS

| | | | |
|---|---|---|---|
| 4,800,985 | 1/1989 | Hanzawa et al. | 181/229 |
| 5,014,816 | 5/1991 | Dear et al. | 181/229 |
| 5,317,112 | 5/1994 | Lee | 181/250 |
| 5,349,141 | 9/1994 | Horibe et al. | 181/227 X |
| 5,424,494 | 6/1995 | Houle et al. | 181/229 |
| 5,502,283 | 3/1996 | Ukai et al. | 181/228 |

FOREIGN PATENT DOCUMENTS

| | | |
|---|---|---|
| A-234 383 | 1/1945 | Germany. |
| 0126214 | 6/1987 | Japan .................. 181/250 |
| A-1 160 983 | 8/1969 | United Kingdom. |
| 2 096 529 | 10/1982 | United Kingdom. |

OTHER PUBLICATIONS

S.J. Skaistis, "New Techniques Muffle Hydraulic Noise", Machine Design, vol. 51, No. 7, Mar. 1979, pp. 120–126.

*Primary Examiner*—Khanh Dang
*Attorney, Agent, or Firm*—Skjerven, Morrill, MacPherson, Franklin & Friel; Alan H. MacPherson

[57] ABSTRACT

A hollow plastic product having a sound/noise attenuating function is provided. The product includes a duct (1) defining a flow passage and extending over a length along a longitudinal axis, a resonator (1b) having an internal chamber (1b') and a connector (1c) which establishes a fluidic communication between the flow passage of duct (1) and the internal chamber (1b') of resonator (1b). The resonator (1b) serves to absorb or attenuate sound/noise created by the fluid flowing through the flow passage. The product is manufactured from the same parison at the same time and thus has a unitary structure. An improved method for manufacturing such a hollow plastic product is also provided.

4 Claims, 9 Drawing Sheets

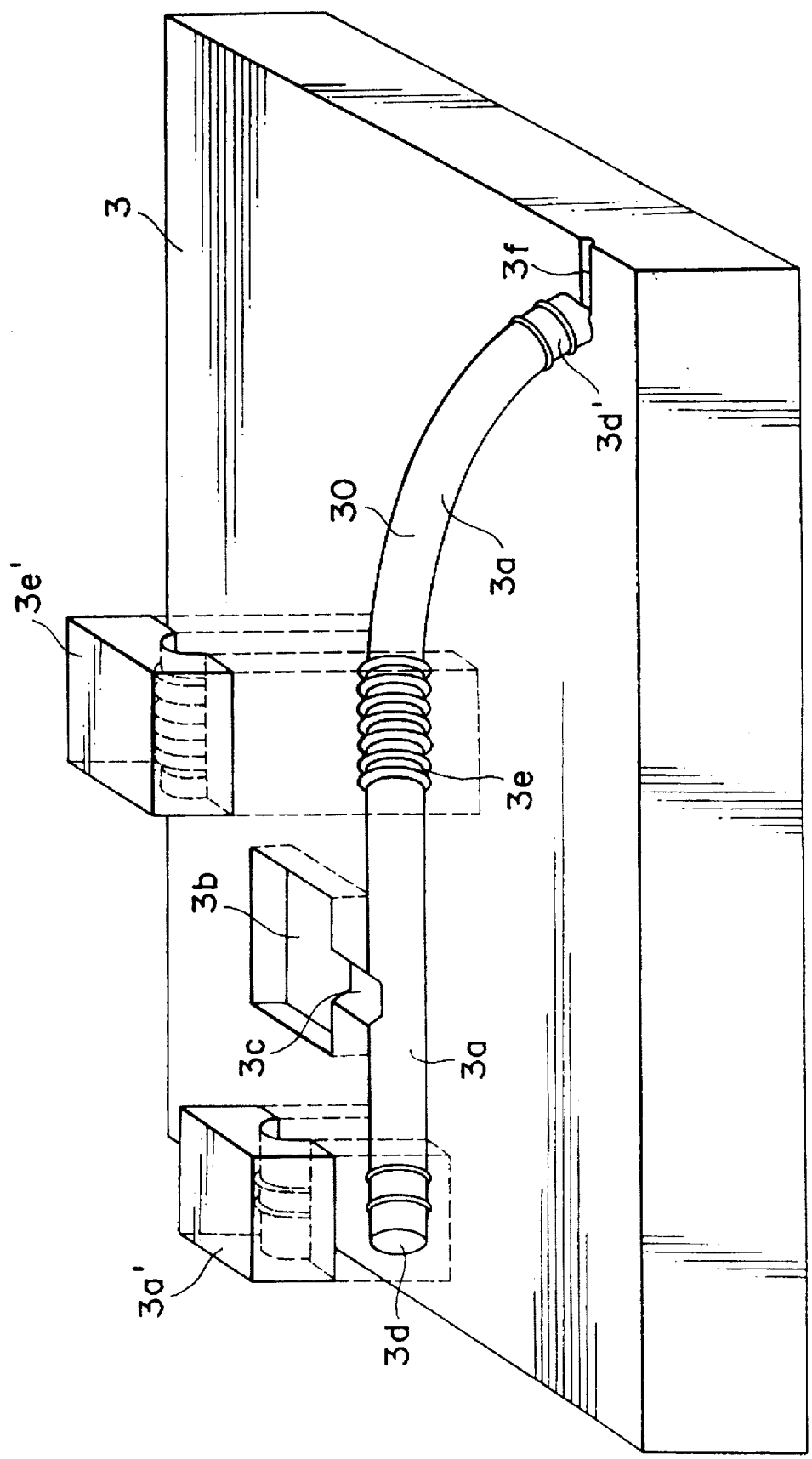

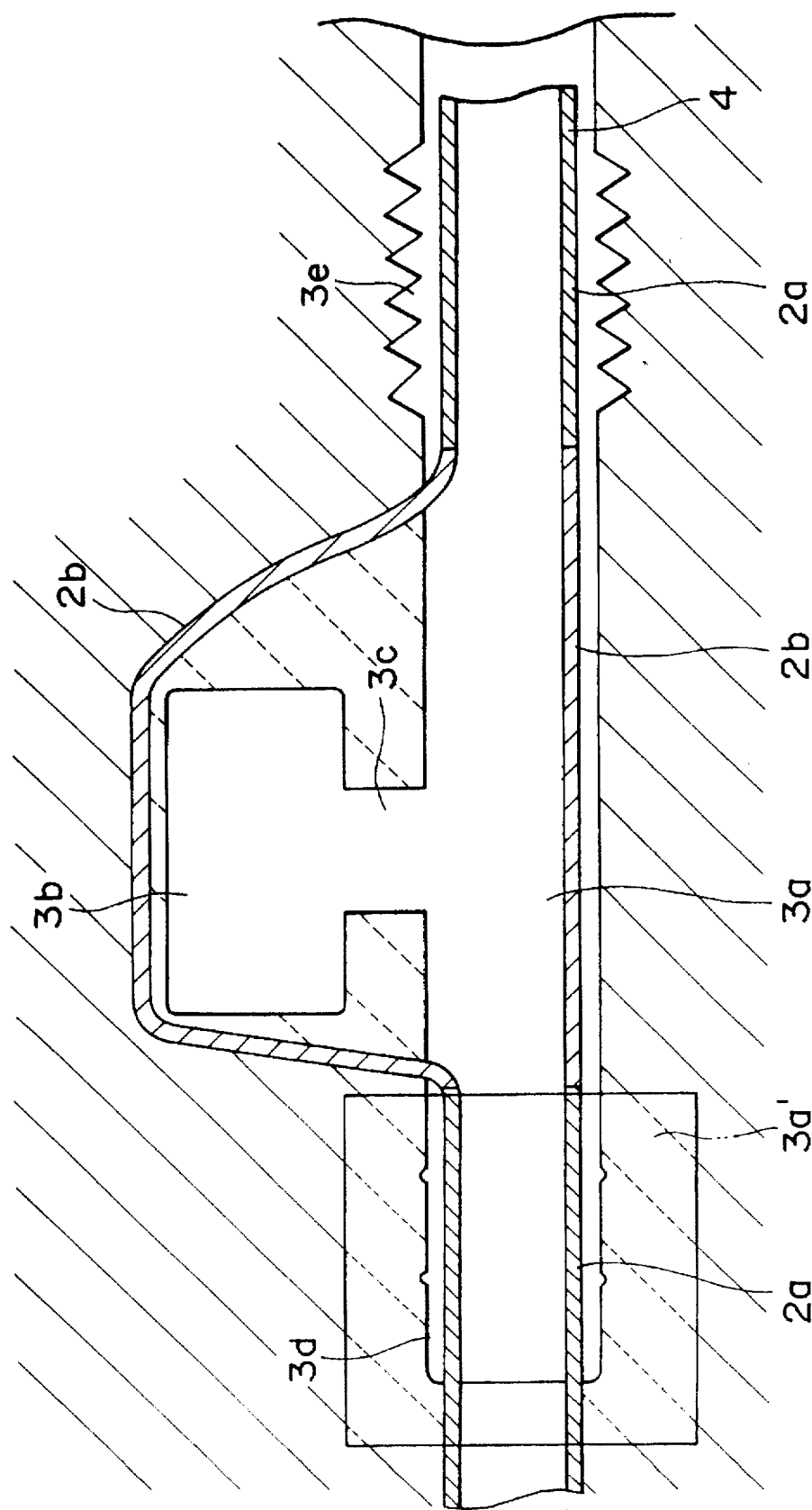

HOLLOW PLASTIC PRODUCT HAVING A SOUND ATTENUATOR

BACKGROUND OF THE INVENTION

1. Field of the Invention

This invention generally relates to a hollow plastic product and its manufacturing method, and, in particular, to a hollow plastic product including a sound/noise attenuator and its manufacturing method. The present invention is particularly suitable for application to ducts, pipes, hoses, etc. which require at least attenuation of sound/noise created by the gas flowing therethrough. The present invention is thus most suitable for application to an air intake duct of an internal combustion engine or the like of an automobile for attenuating or preferably "killing" the sound/noise created by the air flowing therethrough.

2. Description of the Prior Art

It has been known to provide a sound attenuator (muffler) in communication with an air passage, such as a duct, pipe, hose or the like, for attenuating or preferably removing an intake noise created by the air flowing through the passage. For example, in the automobile industries, since significant noise is created by the air flowing through an air intake duct for guiding the air into an internal combustion engine, use has been made of a sound attenuator, often referred to as a resonator, having a function to reduce the noise level in communication with the air intake duct. The resonator defines a chamber or cavity having a predetermined volume which is in fluidic communication with the interior of an associated air intake duct. The noise created by the air flowing through the air intake duct is then absorbed by the resonator at least partly so that the overall noise level can be reduced.

In general, in an air intake system, such as the one used in the automobile industries, an air intake flow passage is typically defined by a duct, pipe, hose or the like having a relatively rigid characteristic, such as a metal or a hard plastic material, because of the requirements for an anti negative pressure characteristic during intake and temperature conditions in use. The air intake flow passage is also required to have a relatively soft characteristic especially at its end portions and an intermediate portion where absorption of vibration is required or bendability is required. For this purpose, use has been typically made of rubber for these portions, or, alternatively, use may be made of a relatively soft plastic material.

When the resonator is provided for at least attenuating the level of the sound/noise produced by the air flowing through the flow passage, the resonator is typically provided to be in fluidic communication with a portion of the flow passage which has a relatively hard characteristic and the resonator is also defined to have a relatively hard characteristic to maintain its shape. However, because of the difficulty in manufacture, according to the prior art, the resonator has been manufactured separately from the duct (pipe, hose, or the like) and the resonator has been connected to the duct using a connector component, such as a connecting hose or connecting clamp, or, the resonator has been fused together with the duct if the duct and the resonator both comprised of a thermoplastic material.

Referring to FIG. 5, there is shown a typical air intake system for use with an internal combustion engine, for example, of an automobile according to the prior art. In the illustrated example, the air flow passage is mainly defined by a duct (pipe, hose, etc.) components 51 and 52 of a metal or a hard plastic material so as to provide a resistance against the negative pressure created during an air intake operation. And, these duct components 51 and 52 are interconnected by a connector component 54 of rubber having the shape of bellows so as to absorb vibration and/or provide a bending characteristic. The rubber connector component 54 is tightly connected to the duct components 51 and 52 by clamps 58, respectively. And an end fitting 53 of rubber is also tightly connected to the other end of the duct component 51 by clamp 58 and another end fitting 55 of rubber is also tightly connected to the other end of the duct component 52 by clamp 58.

The resonator 56 generally in the shape of a rectangular box has a predetermined internal volume which is to be set in fluidic communication with the interior of the air flow passage defined by the duct component 51. The internal volume of the resonator 56 is typically so determined to attenuate the noise created by the air flowing through the air passage most effectively. And, the resonator 56 has been manufactured by blow molding as a unit, or, alternatively, injection molding in two segments which are later fused together by heat. However, since the resonator 56 is located radially outwardly in a projecting manner with respect to the longitudinal axis of the duct component 51, the resonator 56 must have been manufactured separately from the duct component 51 and later assembled together with the duct component 51 using a connector component 57 which is typically comprised of rubber. In the case where the resonator 56 and the duct component 51 were both comprised of a thermoplastic material, they were often fused together by heat to define an integral structure. However, difficulty has been encountered in fusing these two components together by heat with high reliability and at low cost.

SUMMARY OF THE INVENTION

In accordance with one aspect of the present invention, there is provided a hollow plastic product having a sound attenuating function, which includes a duct for defining a flow passage along a longitudinal axis and a resonator which defines a chamber having a predetermined volume and in fluidic communication with the interior of the duct, the hollow plastic product being manufactured by blow molding from the same parison at the same time. Since the interior or flow passage defined by the duct is in fluidic communication with the chamber defined by the resonator, the noise or sound created by the fluid flowing through the duct is at least attenuated by the resonator. The volume of the resonator is preferably so set to absorb the noise or sound having a particular frequency most effectively in reducing the sound or noise level.

In accordance with this aspect of the present invention, since the duct and the resonator are both manufactured at the same time from the same plastic material by blow molding, the plastic product has a unitary structure as a whole so that there is no need to assemble the duct and the resonator together, for example, by fusing with heat as in the prior art. Thus, it is not only easy to manufacture, but also the integrity of the product is significantly improved. Preferably, the duct has a portion comprised of a relatively soft plastic material at least partly, and the portion may be an end fitting portion defined at least at one end of the duct for coupling to another component or an intermediate portion for absorption of vibration or the like.

In accordance with another aspect of the present invention, there is provided a method for manufacturing a hollow plastic product having a sound attenuating function, comprising the steps of extruding a first parison section of a relatively soft plastic material having a first thickness and locating the first parison section along and within a first cavity section of a cavity defined in a first mold half, placing a mold core segment over the first cavity section to contain the first parison section therebetween, extruding a second parison section of a relatively hard plastic material having a second thickness larger than the first thickness and locating the second parison section along a second cavity section, larger than said first cavity section in a radial direction at least partly, while applying a pressurized gas having a first pressure level into the parison to thereby have the second parison section inflated to some extent such that a predetermined part of the second parison section is located outside of the second cavity section, bringing a second mold half in pressure contact with the first mold half, and carrying out blow molding.

The first cavity section defines an end fitting section of a resulting plastic product. The second cavity section defines at least a part of a duct and also a resonator in fluidic communication with the duct. Thus, the second cavity section includes at least a duct cavity portion, a resonator cavity portion and a connection portion between the duct cavity portion and the resonator cavity portion. And, when the second parison section is inflated to some extent, it is so controlled that the inflated second parison section covers both of the resonator cavity portion and the connection portion while the inflated parison section remains located inside the duct cavity section at the side opposite to the side where the resonator cavity portion is provided.

Since the second parison section has a part which is sandwiched between the mating surfaces of the first and second mold halves when blow molding is carried out, that sandwiched part becomes a flash after blow molding, which must be removed by a knife or the like.

It is therefore a primary object of the present invention to provide an improved hollow plastic product having a sound attenuating function and a method for manufacturing the same.

Another object of the present invention is to provide a hollow plastic product having a sound attenuating function which is sturdy and reliable in structure and easy to manufacture.

A further object of the present invention is to provide an improved air intake system particularly suitable for use in an automobile and its manufacturing method.

Other objects, advantages and novel features of the present invention will become apparent from the following detailed description of the invention when considered in conjunction with the accompanying drawings.

BRIEF DESCRIPTION OF THE DRAWINGS

FIG. 1b-1 is a schematic illustration showing in longitudinal cross section the hollow plastic product shown in FIG. 1a;

FIG. 1b-2 is a schematic illustration showing in longitudinal cross section somewhat on an enlarged scale a part of the hollow plastic product shown in FIG. 1a;

FIG. 1c is a schematic illustration showing in perspective view a lower mold half and its associated first and second mold core segments for use in a method for manufacturing a hollow plastic product according to one embodiment of the present invention;

FIGS. 1d through 1h are schematic illustrations showing a series of steps for manufacturing a hollow plastic product according to one embodiment of the present invention;

FIG. 3b is a schematic illustration showing the partially inflated parison section at a step of manufacturing the hollow plastic product shown in FIG. 3a;

DESCRIPTION OF THE PREFERRED EMBODIMENTS

Figure 1A:
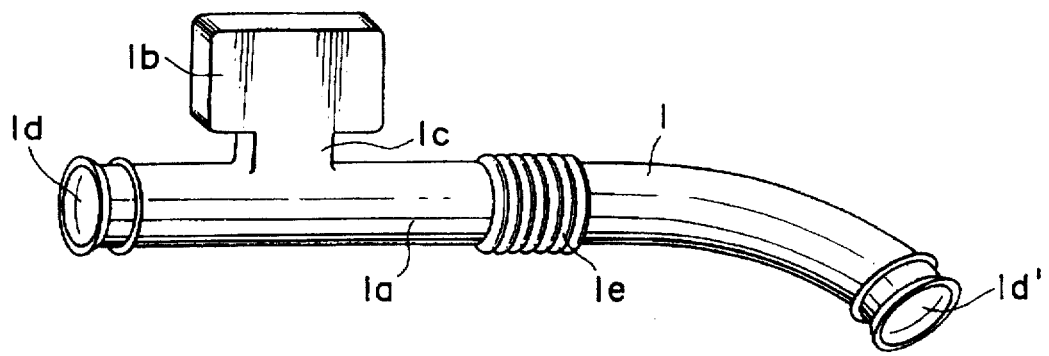
FIG. 1a is a schematic illustration showing in perspective view a hollow plastic product having a sound attenuating function constructed in accordance with one embodiment of the present invention.

Referring now to FIG. 1a, there is schematically shown a hollow plastic product 1 having a sound/noise attenuating function constructed as an air intake system of an internal combustion engine for use in an automobile according to one embodiment of the present invention. As shown, the hollow plastic product 1 includes a duct 1a, which defines a flow passage for guiding an air flow, a resonator 1b, which serves to attenuate or absorb the sound or noise created by the air flowing through the duct 1a, and a connector 1c, which establishes a fluidic communication between the interior of the duct 1a with the interior or chamber of the resonator 1b. In the hollow plastic duct 1 shown in FIG. 1a, end fitting portions 1d and 1d' are provided at the opposite ends of duct 1a and an intermediate portion 1e in the form of bellows is also provided in duct 1a. The bellows portion 1e serves to absorb vibration and provide a bending characteristic. Thus, for example, when the end fitting portion 1d is coupled to an internal combustion engine, any vibration transmitted to the end fitting portion 1d from the engine may be absorbed by the bellows portion 1e so that it is prevented from being transmitted to the other end fitting portion 1d'. Besides, because of the provision of the bellows portion 1e, there is provided easiness in mounting the product 1 in position. As will be described in detail later, these end fitting portions 1d and 1d' and the intermediate portion 1e are comprised of a relatively soft plastic material as compared with a relative hard plastic material used for the rest of the product 1.

It is important to note that the product 1 has a unitary structure and thus is not an assembly of a plurality of parts. More specifically, the product 1 has been manufactured from the same parison by blow molding at the same time. Thus, there is neither fused connection by heat nor physically clamped connection. As a result, the product 1 has a reliable and sturdy structure so that the possibility of leakage is virtually eliminated.

Figures 1, 1B:
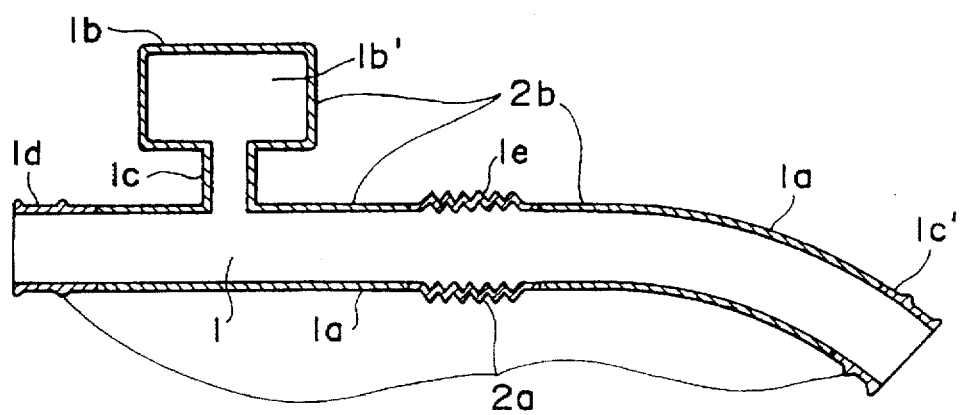

As shown in FIG. 1b-1 in cross section, the end fitting portions 1d and 1d' and the intermediate bellows portion 1e are comprised of a relatively soft plastic material 2a, whereas the duct 1a, the resonator 1b and the connector 1c are comprised of a relatively hard plastic material 2b. As well known as the exchange technology in the art, there is a technique for extruding a composite parison whose composition is switched from one plastic material to another along its longitudinal axis so that a composite parison having a first length comprised of a relatively soft plastic material and a second length continuous with the first length and comprised of a relatively hard plastic material can be formed using the exchange technology. Thus, such a composite parison can be advantageously used in manufacturing the product 1.

Figures 1, 1B, 2:
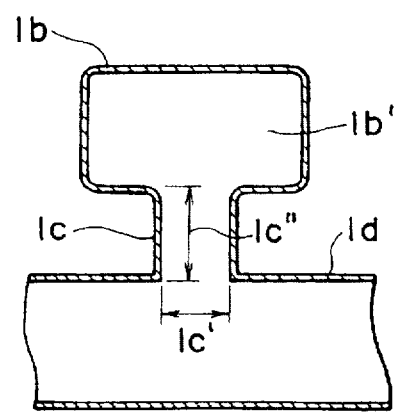

As shown in FIG. 1b-2, the product 1 has the resonator 1b as a radially extending projection with respect to the longitudinal axis of the duct 1a. In the illustrated embodiment, the resonator 1b has an internal chamber 1b' having a predetermined volume and the internal chamber 1b' is in fluidic communication with the internal passage of the duct 1a through a communicating passage defined by the connector 1c. The connector 1c has a width 1c' and a length 1c" in the illustrated embodiment. The internal volume of the chamber 1b' and the width 1c' and length 1c" of the connector 1c should be set appropriately so as to absorb or attenuate the sound or noise having a particular frequency created by the fluid flowing through the duct 1a.

As shown in FIGS. 1a, 1b-1 and 1b-2, the duct 1a, resonator 1b and connector 1c are not assembled, but they have been manufactured from the same parison at the same time to define a unitary structure without physical connection therebetween and the product 1 has an asymmetrical structure with respect to the longitudinal axis of the duct 1a because of the provision of the resonator 1b, which is a radially extending projection in one direction normal to the longitudinal axis of the duct 1a. Thus, difficulty is encountered in manufacturing the product 1 according to the conventional blow molding method.

Under the circumstances, according to one aspect of the present invention, there is provided an improved method for manufacturing the hollow plastic product 1. FIG. 1c shows a lower mold half 3 which may be advantageously used for the present method and FIGS. 1d through 1h illustrate a sequence of steps for manufacturing the hollow plastic product 1 shown in FIG. 1a according to one embodiment of the present method.

The lower mold half 3 shown in FIG. 1c has a flat mating surface in which a cavity 30 is engraved in commensurate with the outer shape of the hollow plastic product 1. Thus, the cavity 30 includes a duct cavity section 3a, a resonator cavity section 3b, a connector cavity section 3c, end fitting cavity sections 3d and 3d' and an intermediate bellows cavity section 3e. The cavity 30 also includes an air pin guide 3f which is in fluidic communication with the duct cavity section 3a so that an air pin (not shown) may be fitted into the interior of a parison received in the duct cavity section 3a so as to introduce a pressurized gas into the interior of the parison. The duct cavity section 3a has a generally semicircular in cross section and the resonator cavity section 3b and the connector cavity section 3c has a generally rectangular cross section in this example.

As also shown in FIG. 1c, a pair of mold core segments 3a' and 3e' are provided in association with the lower mold half 3. As indicated by the dotted lines in FIG. 1c, these mold core segments 3a' and 3e' may be fixedly attached or clamped to respective associated locations of the lower mold half 3 by any appropriate fixing means after a parison has been set in position. These mold core segments 3a' and 3e' serve to prevent associated portions of a parison from being inflated to extend beyond the Boundary of the cavity 30 when a preliminary blow molding operation is carried out as will become clear later. Although not shown in FIG. 1c, it should be understood that there is also an upper mold half which may be brought into intimate contact with the lower mold half 3 when blow molding is carried out. Such an upper mold half should have a mating surface which is formed with a pair of recesses to receive therein the respective mold core segments 3a' and 3e' when the upper and lower mold halves are brought into their clamped condition.

Figure 1D:
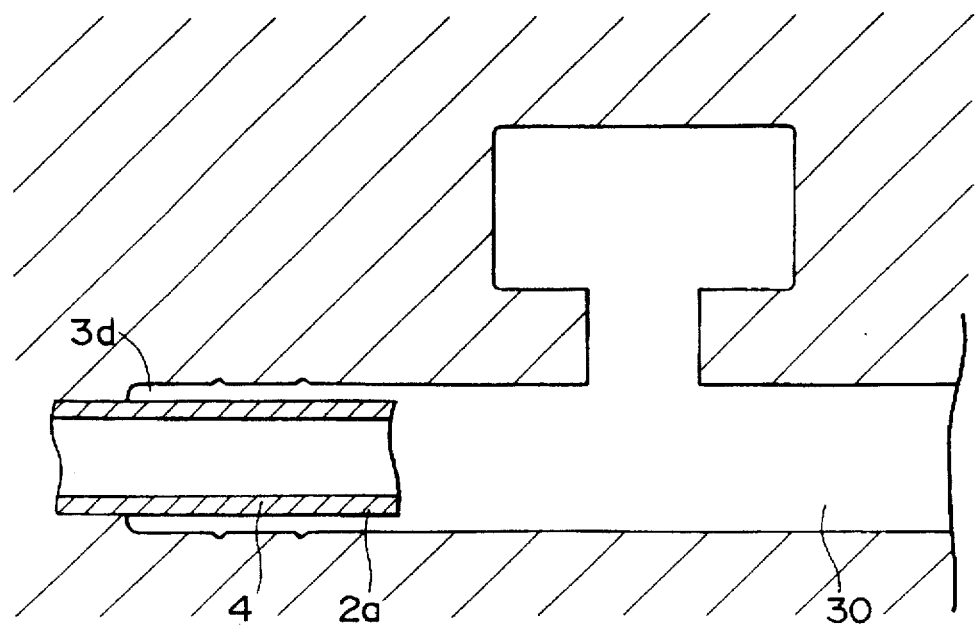

Now, a process for manufacturing the hollow plastic product 1 using the mold half 3 shown in FIG. 1c will be described step by step with reference to FIGS. 1d through 1h. As shown in FIG. 1d, a first section of parison 4, which is comprised of a relatively soft plastic material 2a, is extruded from a nozzle (not shown) and the first parison section 2a thus extruded is located along and within the left end fitting section of the cavity 30. In this instance, the tip end of the parison 4, which is typically closed by parison pinch as well known in the art though not shown, is located on a top mating surface of mold half 3 and the parison 4 is laid down into the cavity 30 over a left end 3d thereof. The parison 4 thus extruded is typically provided with a relatively low pressurized gas. The first parison section 2a has a first thickness and an outer diameter such that it may be received in the corresponding section of cavity 30.

Figure 1E:
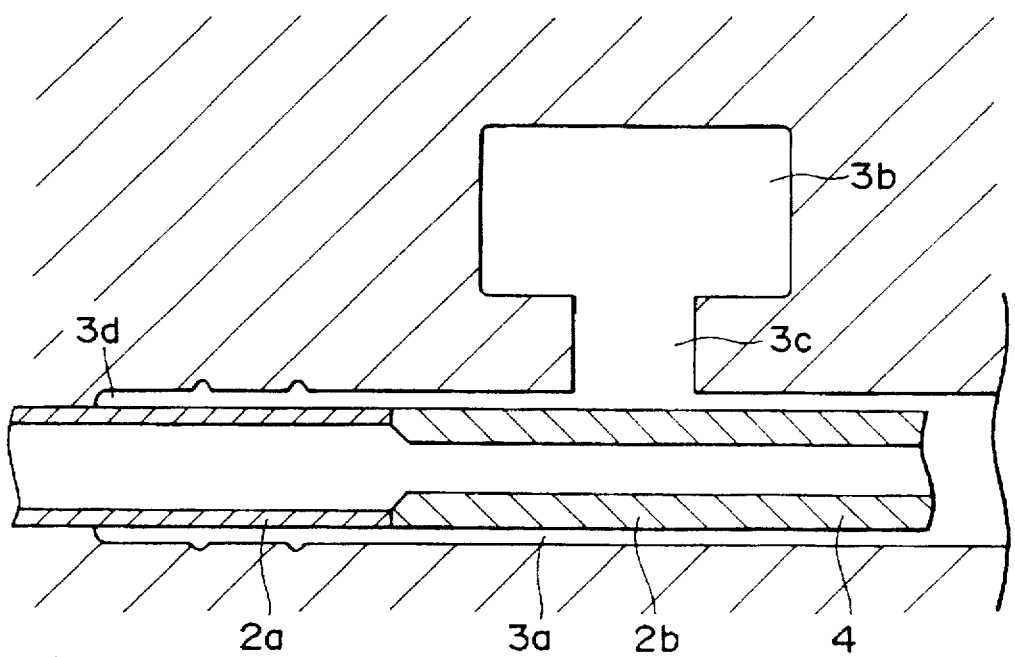

After extrusion of the first parison section 2a over a first length corresponding to the left end fitting portion 1d of resulting product 1, the composition of the parison 4 extruded from the nozzle (not shown) is switched to a relatively hard plastic material 2b to form a second parison section 2b having a second thickness which is larger than the first thickness. As shown in FIG. 1e, the second parison section 2b is laid down along the duct cavity section 3a of cavity 30. In this instance, the second prison section 2b may or may not be located within the cavity 30.

Figure 1F:
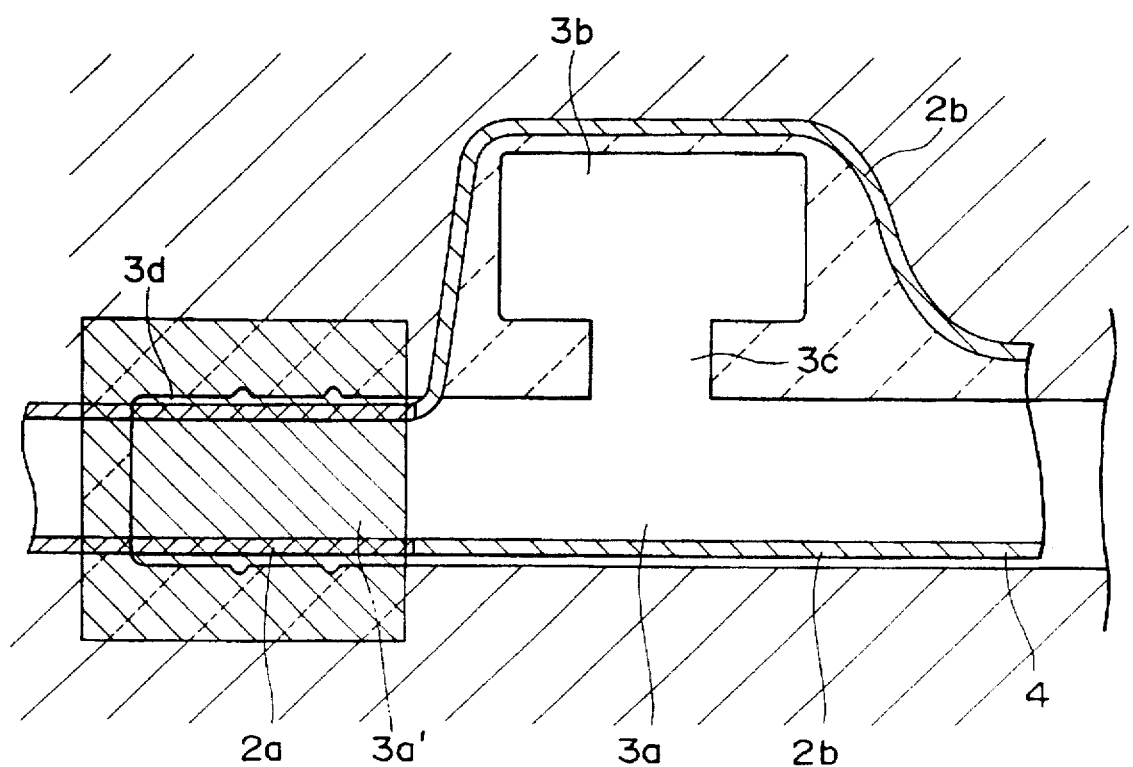

Then, as shown in FIG. 1f, a first mold core segment 3a' is fixedly attached to the mating surface of lower mold half 3 in position to cover the first parison section 2a of parison 4. The first mold core segment 3a' is also formed with a cavity complementary to the cavity 30 of lower mold half. Thereafter, the pressure of the gas introduced into the parison 4 is increased to have the parison 4 inflated. In this instance, since the first parison section 2a is arrested by a combination of the lower mold half 3 and the first mold core segment 3a', the first parison section 2a is prevented from being inflated beyond the outer circumference defined by the lower mold half 3 and the first mold core segment 3a'. On the other hand, since the second parison section 2b is not constrained, it becomes inflated so that its outer diameter becomes larger and its thickness becomes thinner to a desired magnitude.

Of importance, the second parison section 2b must be inflated sufficiently to cover not only the connector cavity section 3c but also the resonator cavity section 3b as shown in FIG. 1f. Described more in detail in this respect, when the second parison section 2b is inflated by supplying an increased level of pressurized gas, a part of the second parison section 2b thus inflated must extend beyond a boundary of the duct cavity section 3a to cover the connector and resonator cavity sections 3c and 3b as shown in FIG. 1f while keeping the other side of the second parison section 2b remains within the duct cavity section 3a. This may be achieved by manually maneuvering the second parison section as it becomes inflated, or, as a preferred alternative, a portion of the top mating surface of the lower mold half 3 around the resonator and connector sections 3b and 3c may be recessed or stepped with a contour commensurate with the contour of the inflated second parison section 2b as shown in FIG. 1f. As a further alternative, use may be temporarily made of a guide member having a shape commensurate with the outer contour of the inflated second parison section 2b shown in FIG. 1f so that the outer shape of the second parison section 2b is constrained when inflated to the shape as shown in FIG. 1f. In this case, the guide member is removed after having the second parison section 2b inflated to a desired shape as shown.

Then, the composition of the parison 4 extruded from the nozzle (not shown) is once again switched to a relatively soft plastic material 2a to define a third parison section corresponding to the intermediate bellows portion 1e of the resulting product 1. And, this third parison section is laid down along and in the bellows cavity section 3e of cavity 30 as shown in FIG. 1g. Since the third parison section must be received in the bellows cavity section 3e, the level of pressurized gas supplied into the parison 4 is once again lowered. Moreover, the thickness of the third parison section is also adjusted by adjusting the amount of the parison discharged from the nozzle (not shown) per unit time.

If desired, use may be made of a second mold core segment 3e' at this stage to have it fixedly attached to the top mating surface of lower mold half 3 in position as previously shown in FIG. 1c. The use of such a second mold core segment 3e' may be preferred especially when difficulty is encountered in providing a bellows contour in the upper mold half. However, the use of such a second mold core segment 3e' is not necessary by all means in accordance with the principle of the present invention.

Figure 1H:
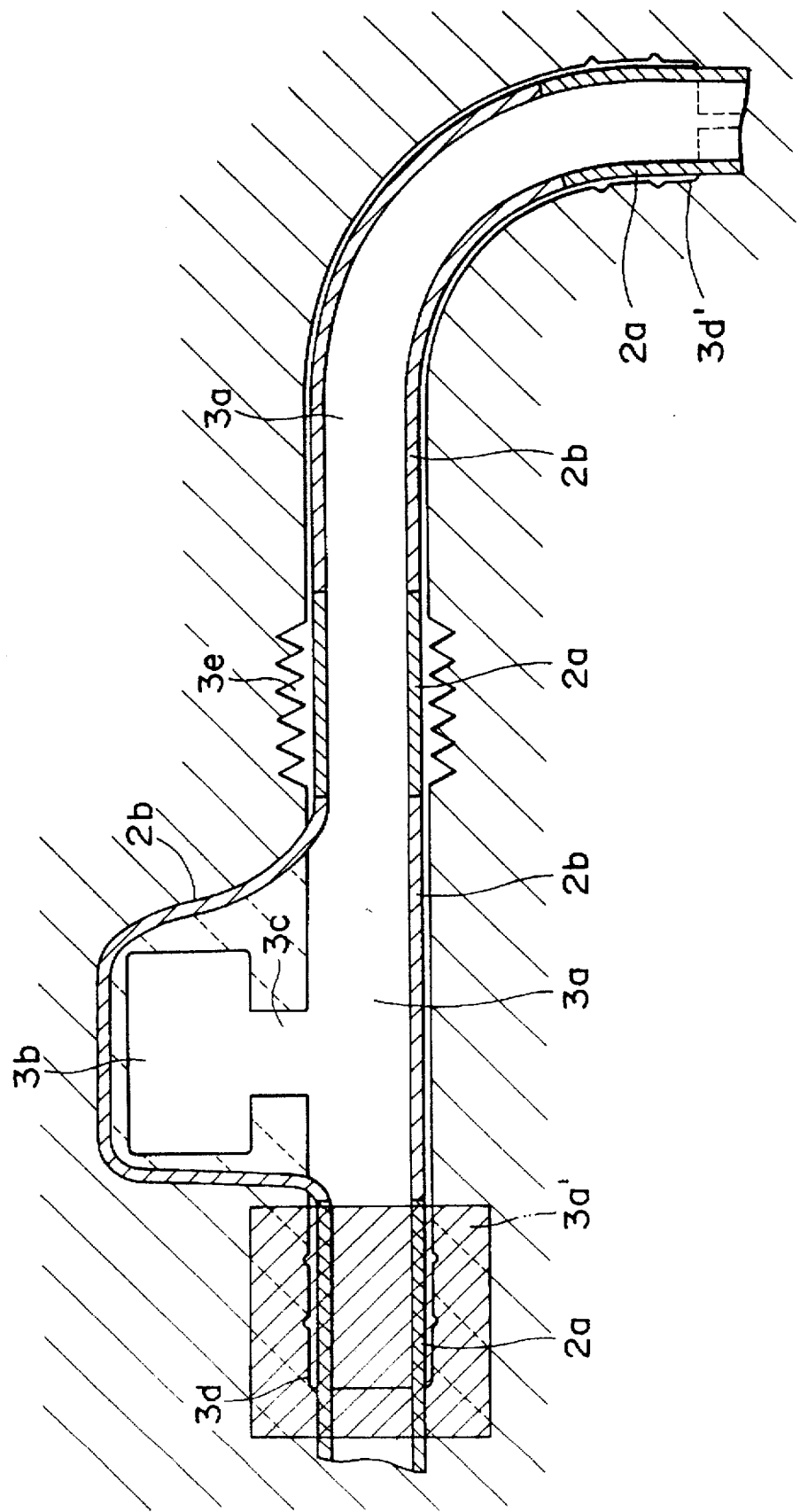

Then, as shown in FIG. 1h, the composition of parison 4 is once again switched to a relatively hard plastic material 2b to define a fourth parison section having a fourth length which is located within the duct cavity section 3a. After extruding the fourth parison section, the composition of parison 4 is again changed to a relatively soft plastic material 2a to define a fifth parison section having a fifth length corresponding to the right end fitting portion 1d' of resulting product 1. And, this fifth parison section is located inside the right end fitting cavity section of cavity 40. The parison 4 then extends beyond a right end 3d' of cavity 30 over a desired length on the top mating surface of lower mold half 3. Since the fourth and fifth parison sections are not inflated significantly, these sections have a relatively thin thickness preferably the same thickness as the first parison section.

Upon completion of supply of the composite parison 4 as shown in FIG. 1h, an associated upper mold half (not shown) is brought into intimate contact with the lower mold half 3 to carry out clamping. In this case, that portion of the inflated parison section covering the resonant and connector cavity sections 3b and 3c that lies on the mating surface of lower mold half 3 becomes clamped between the mating surfaces of the upper and lower mold halves. Then, an increased level of pressured gas is introduced into the interior of the parison through an air pin to carry out blow molding. Upon completion of shaping by blow molding, the upper and lower mold halves are separated to remove the molded product. Then, a flash is removed from the product, particular from that portion around the resonator 1b and connector 1c to complete the hollow plastic product 1 as shown in FIG. 1a.

Figure 2A:
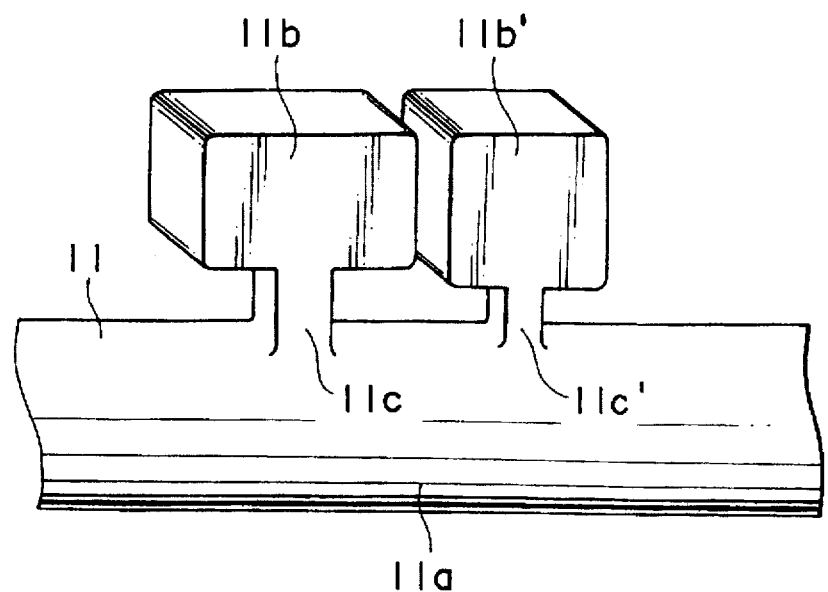
FIGS. 2a and 2b are schematic illustrations showing in perspective view and longitudinal cross section, respectively, of a hollow plastic product having a pair of resonators according another embodiment of the present invention.
Figure 2B:
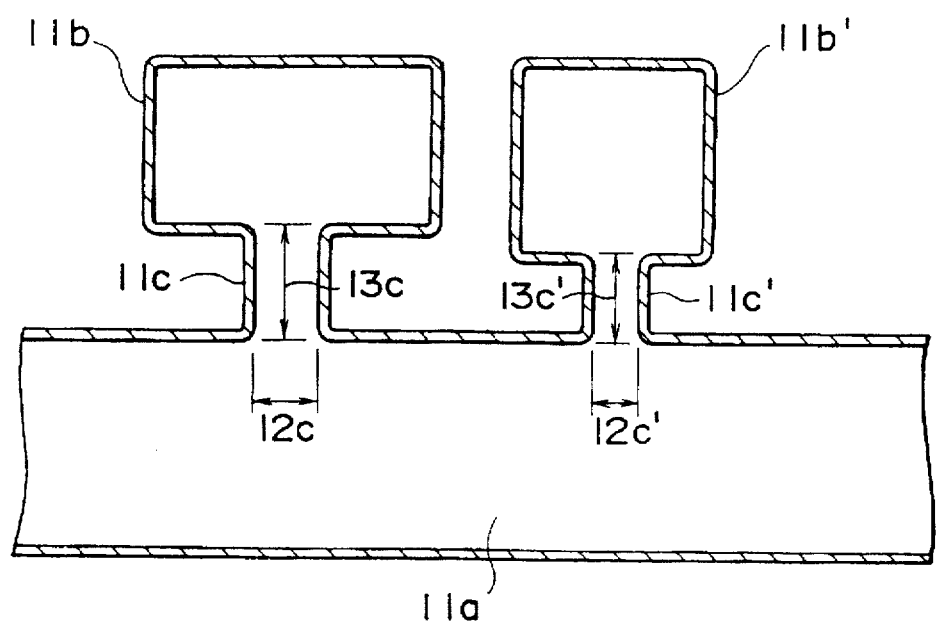

FIGS. 2a and 2b illustrate in perspective view and cross section, respectively, a hollow plastic product having a sound/noise attenuation function constructed in accordance with another embodiment of the present invention. As shown, the hollow plastic product of this embodiment has a pair of first and second resonators 11b and 11b' which are different in internal volume. As shown in FIG. 2b, the first resonator 11b is generally rectangular in shape and its internal chamber is in fluidic communication with the flow passage of duct 11a through a connector 11c having width 12c and length 13c, and the second resonator 11b' is also generally rectangular in shape and its internal chamber is in fluidic communication with the flow passage of duct 11a also through a connector 11c' having width 12c' and length 13c'. The first resonator 11b is designed specifically to absorb or attenuate sound or noise having a first frequency and the second attenuator 11b' is designed specifically to absorb or attenuate sound or noise having a second frequency.

Although not shown in FIGS. 2a and 2b specifically, the duct 11a is typically provided with an end fitting portion comprised of a relatively soft plastic material as compared with a relatively hard plastic material used for the duct 11a, resonators 11b and 11b' and connectors 11c and 11c' similarly with the first embodiment shown in FIG. 1a. The hollow plastic product of this embodiment can be manufactured by a method which has been described with reference to FIGS. 1d through 1h with reference to the first embodiment.

Figure 3A:
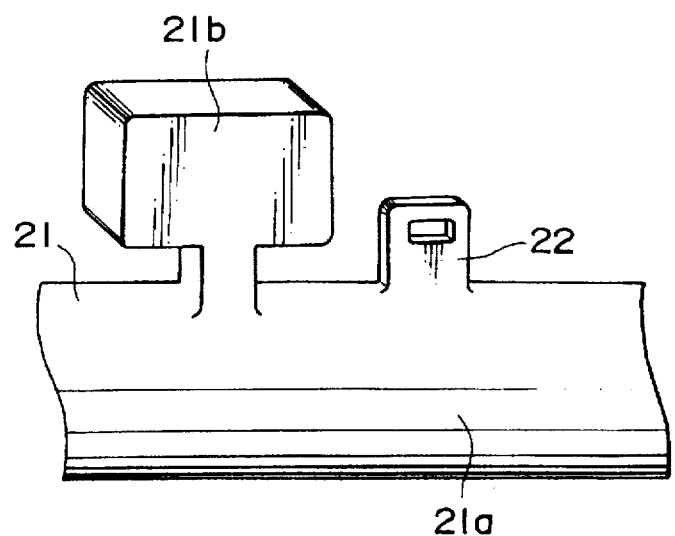
FIG. 3a is a schematic illustration showing in perspective view a hollow plastic product having a resonator and a bracket according to a further embodiment of the present invention.
Figure 3B:
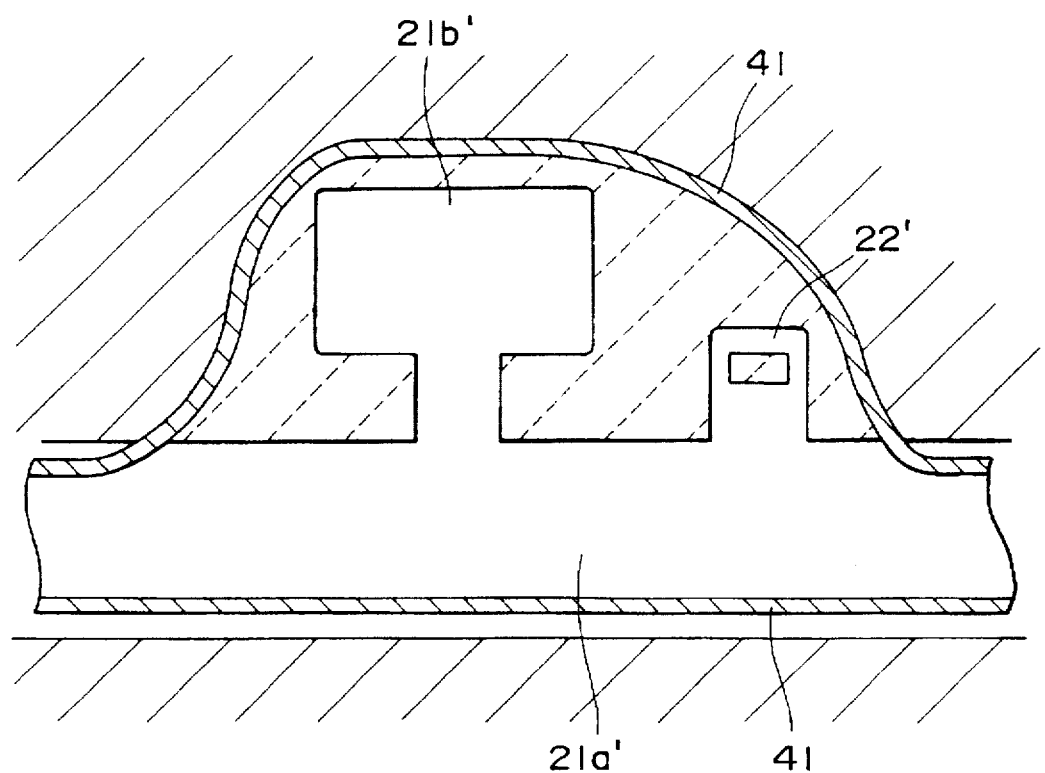

FIGS. 3a illustrates a further embodiment 21 of the present invention, in which provision is made of a bracket 22 in the vicinity of a resonator 21b as projections extending in the same radial direction with respect to the longitudinal axis of its associated duct 21a. The hollow plastic product 21 shown in FIG. 3a can also be manufactured by a method which has been described with reference to FIGS. 1d through 1h. FIG. 3b illustrates a step of such a method where a parison 41 is partially inflated such that its inflated portion extends beyond the boundary of a duct cavity section 21a' onto a top mating surface of a lower mold half to cover a resonator cavity section 21b' and a bracket cavity section 22'. In this manner, both of the resonator 21b and the bracket 22 can be manufactured from the same parison 41 which defines the duct 21a of hollow plastic product 21. Thus, the hollow plastic product 21 has a unitary structure having no connections which are physically clamped or thermally fused later. In this case also, the duct 21a may have an end fitting portion comprised of a relatively soft plastic material as in the previously described embodiments. In addition, it should be noted that the bracket 22 or another bracket may be provided at another location of the duct 21a within the scope of the present invention.

Figure 4:
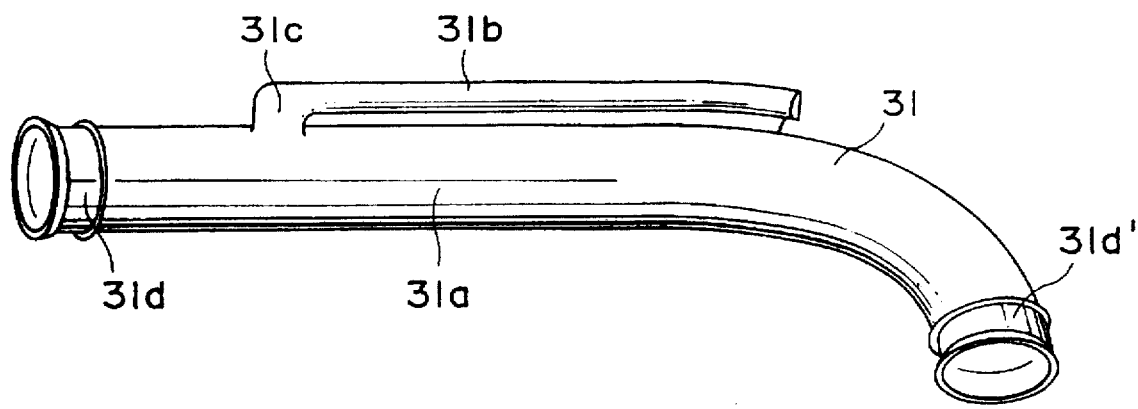
FIG. 4 is a schematic illustration showing a hollow plastic product having an elongated resonator according to a still further embodiment of the present invention.
Figure 5:
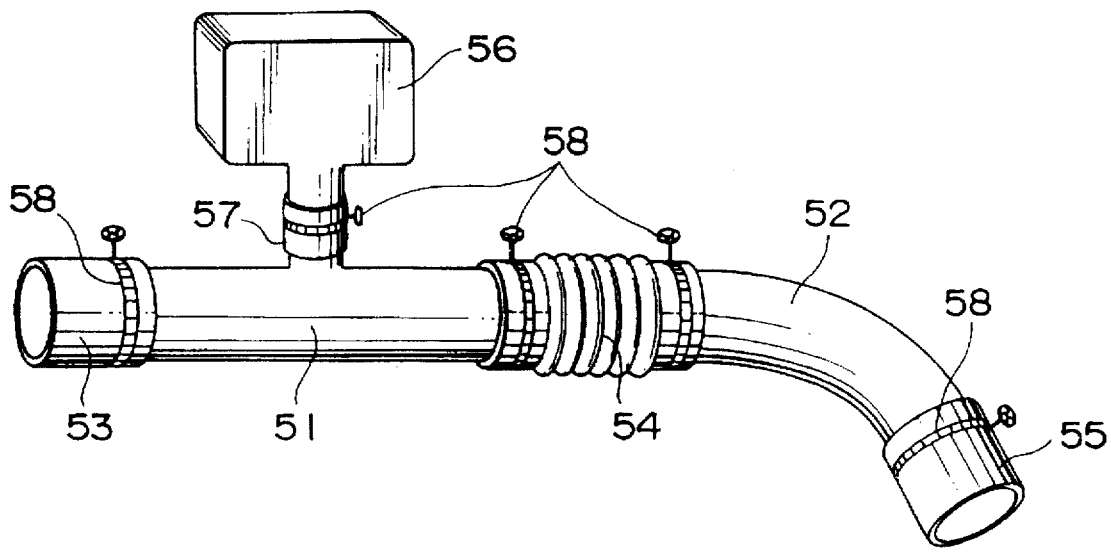
FIG. 5 is a schematic illustration showing in perspective view an assembled air intake system having a resonator for noise attenuation according to the prior art.

FIG. 4 illustrates in perspective view a hollow plastic product 31 having a sound/noise attenuating function in accordance with a still further embodiment of the present invention. The hollow plastic product 31 includes a duct 31a which defines a flow passage for fluid, such as air, and which is provided with end fitting portions 31d and 31d' at its opposite ends comprised of a relatively soft plastic material as compared with a relatively hard plastic material used for the duct 31a. The product 31 also includes an elongated resonator 31b which has an elongated chamber which is in fluidic communication with the flow passage of duct 31a through a connector 31c. The elongated resonator 31b and the connector 31c are comprised of the same material as that used for defining the duct 31a in a unitary structure.

In this embodiment, since the elongated resonator 31b extends substantially in parallel with the longitudinal axis of the duct 31a, there is provided an increased freedom in mounting the hollow plastic product 31 in position. For example, if the hollow plastic product 31 is used as an air intake system of an automobile, it is extremely advantageous because the space around the engine is already crowded.

Now, a hollow plastic product according to the present invention includes a first section comprised of a relatively soft plastic material, such as end fitting portions or intermediate bellows portion, and also a second section comprised of a relatively hard plastic material, such as a duct, a resonator and a connector. Since the present product is manufactured by blow molding, any plastic material may be used as long as it can be used for blow molding. However, preferably, use may be made of PP, PA6, PA66, HDPE (high density polyethylene), PPS and any of these reinforced with glass fibers or fillers as the relatively hard plastic material; whereas, use may be made of a thermoplastic elastomer, such as a polyolefin family elastomer, a polyamide family elastomer, and a polyester elastomer, and LDPE (low density polyethylene) as the relatively soft plastic material. Preferred combinations between the relatively hard and soft plastic materials having good contact characteristics include PP—polyolefin family elastomer, glass fiber reinforced PP—polyolefin family elastomer, PA6—polyamide family elastomer, PA66—polyamide family elastomer, glass fiber reinforced PA6—polyamide family elastomer, glass fiber reinforced PA66—polyamide family elastomer, and HDPE-LDPE.

While the above provides a full and complete disclosure of the preferred embodiments of the present invention, various modifications, alternate constructions and equivalents amy be employed without departing from the true spirit and scope of the invention. Therefore, the above description and illustration should not be construed as limiting the scope of the invention, which is defined by the appended claims.

What is claimed is:

1. A hollow plastic product having a sound attenuating function, comprising:

a duct extending over a length along a longitudinal axis to define a flow passage, said duct being comprised of a first plastic material and said duct is provided with at least one end fitting portion at one end thereof, said end fitting portion being comprised of a second plastic material which is softer than said first plastic material;

a resonator defining a chamber having a predetermined volume and comprised of said first plastic material, said resonator being located at a radial distance from said longitudinal axis;

a connector extending between said duct and said resonator to thereby establish a fluidic communication between said chamber of said resonator with the flow passage of said duct, said connector being comprised of said first plastic material; and wherein said duct, resonator and connector define a unitary structure and said predetermined volume serves to attenuate a sound created by fluid flowing through said flow passage.

2. The hollow plastic product of claim 1, wherein said product is a blow-molded product and said duct, resonator and connector are manufactured from said first plastic material at the same time.

3. The hollow plastic product of claim 1, wherein said product is an air intake system of an automobile.

4. A hollow plastic product having a sound attenuating function, comprising:

a duct extending over a length along a longitudinal axis to define a flow passage, said duct being comprised of a first plastic material and said duct comprising;

at least one intermediate bellows portion at an intermediate portion of said duct, said intermediate bellows portion being comprised of a second plastic material which is softer than said first plastic material;

a resonator defining a chamber having a predetermined volume and comprised of said first plastic material, said resonator being located at a radial distance from said longitudinal axis;

a connector extending between said duct and said resonator to thereby establish a fluidic communication between said chamber of said resonator with the flow passage of said duct, said connector being comprised of said first plastic material; and wherein said duct, resonator and connector define a unitary structure and said predetermined volume serves to attenuate a sound created by fluid flowing through said flow passage.

* * * * *